Figure 3:
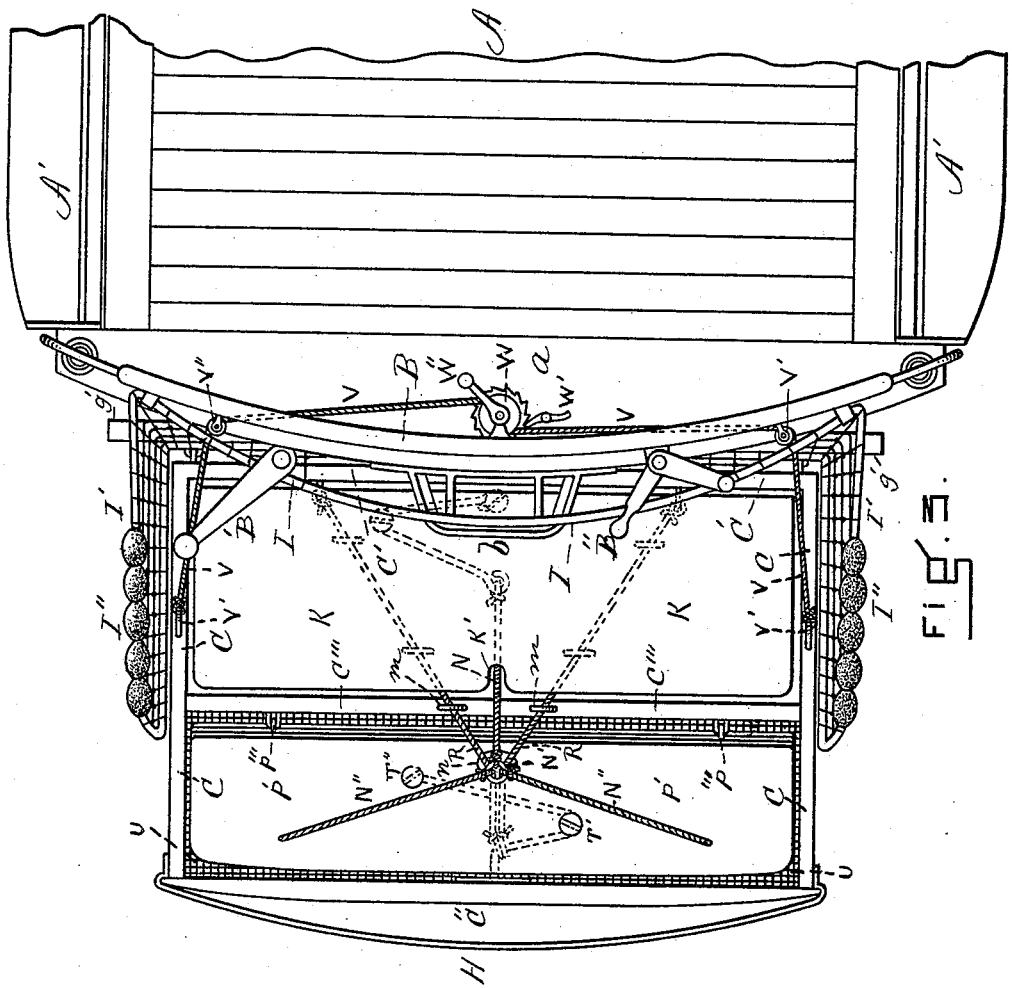

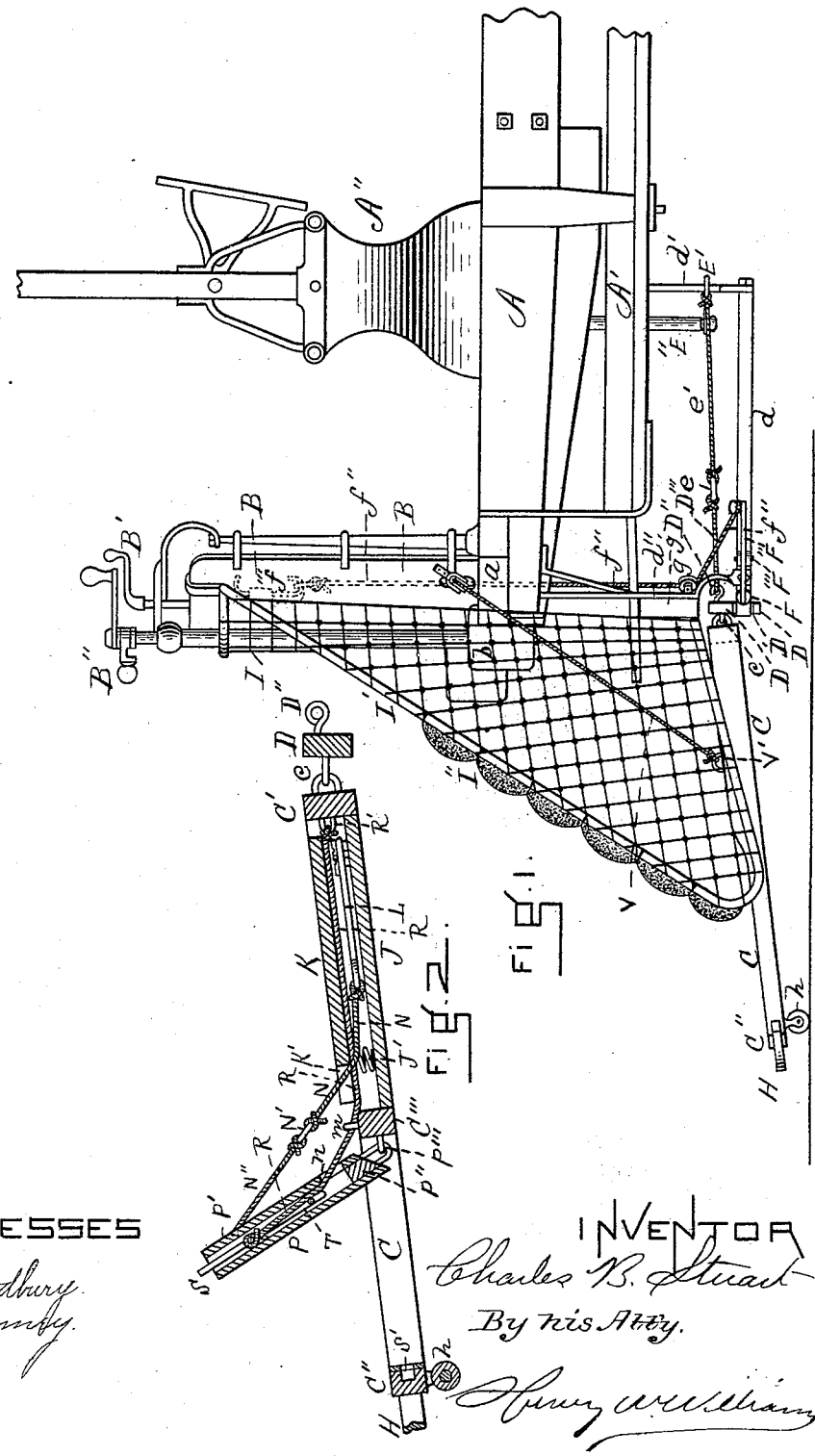

(No Model.)  3 Sheets—Sheet 2.

C. B. STUART.
CAR FENDER.

No. 536,664. Patented Apr. 2, 1895.

Witnesses
E. A. Woodbury.
A. N. Boufrey.

Inventor
Charles B. Stuart,
By his Att'y
Henry W. Williams.

THE NORRIS PETERS CO., PHOTO-LITHO., WASHINGTON, D. C.

(No Model.)
C. B. STUART.
CAR FENDER.
No. 536,664. Patented Apr. 2, 1895.
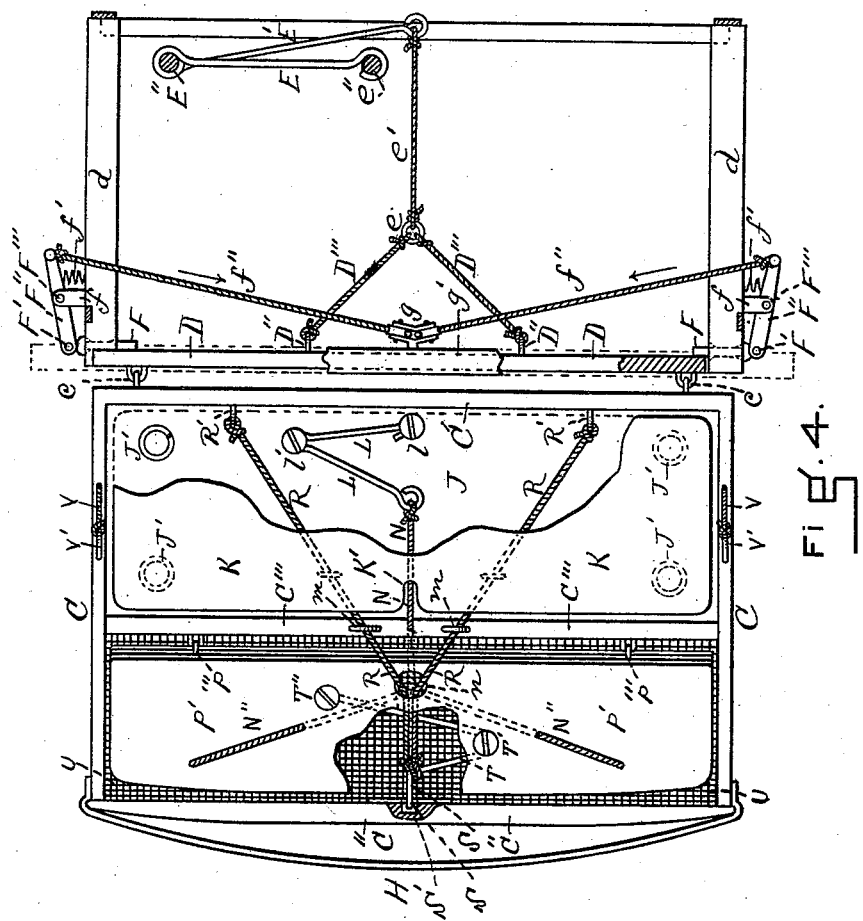
WITNESSES
E. A. Woodbury
A. N. Bounty
INVENTOR
Charles B. Stuart,
By his Att'y
Henry W. Williams

UNITED STATES PATENT OFFICE.

CHARLES B. STUART, OF BOSTON, MASSACHUSETTS.

CAR-FENDER.

SPECIFICATION forming part of Letters Patent No. 536,664, dated April 2, 1895.

Application filed November 17, 1894. Serial No. 529,142. (No model.)

*To all whom it may concern:*

Be it known that I, CHARLES B. STUART, a citizen of the United States, residing at Boston, in the county of Suffolk and State of Massachusetts, have invented new and useful Improvements in Car-Fenders, of which the following is a specification.

This invention relates to fenders for cars, preferably street cars, propelled by electricity, cables or other than horse power, and it consists in the novel construction and arrangement of parts hereinafter described, whereby when a person is struck by the fender, he is tripped thereby and lodged thereon without danger of injury, and the impact or weight of the person struck, as he falls upon the fender, causes a portion of the fender to swing up and inclose him and protect him from injury and danger of falling off.

The nature of the invention in detail is fully described below and illustrated in the accompanying drawings, in which—

Figure 1 is a side elevation of my improved fender applied to a car, a sufficient portion of which is shown to illustrate a practical mode of application. Fig. 2 is an enlarged central, vertical, longitudinal section of the fender with its forward portion lifted or swung up. Fig. 3 is a plan view of the fender applied to a car. Fig. 4 is a plan taken on a line below the car, portions of the fender being represented as broken out the better to illustrate the invention.

In Fig. 1 the fender is represented as having been dropped by the motor-man to the track, as would be the case if a person was on the track and liable to be struck; and in Fig. 2 the forward swinging portion of the fender is in the position produced by a body falling upon the main portion thereof.

Similar letters of reference indicate corresponding parts.

A represents the floor, A' the step, and A" a seat of an ordinary street car, in this instance an open car.

B represents the dash-board, B' the brake-handle, B" the power handle, b the bumper and a the platform, all constructed substantially as usual.

C C represent the side bars, C' the rear bar and C" the forward bar constituting a rectangular fender frame hinged at c to a bar D. This bar is located under the platform a of the car and extends transversely of said car. Its opposite ends are bifurcated as shown at D' in order to embrace and slide on the horizontal longitudinally placed bars d, supported beneath the car, and on opposite sides thereof, by the hangers d' d" extending from the car body. The bar D is centrally provided with rearwardly extending horizontal hooks D" (Figs. 1, 2 and 4) from which cords D''' extend and converge, as shown in Fig. 4, toward a ring e to which they are secured, said ring being connected by a cord e' with the free end of the arm E' of the spring E, which is wound around the barrel or pin E" and secured at its opposite end to the stud e" extending downward from the car-body. (See Fig. 4.)

F F are bolts extending horizontally through the bars d at the rear of the bar D. The tension of the spring E E', through the medium of the cords e' D''', causes the bar D to press tightly against the forward sides of these bolts F. The outer ends of the bolts F are pivoted at F' to levers F" which are pivoted at F''' to brackets f extending horizontally outward from the bars d. Springs f' hold the rear ends of the levers F" outward, and hence the bolts F into engagement with the bar D. Cords f" extend from the rear ends of the levers F'" and pass under pulleys g supported by a bar g', (which may be the brake beam) sustained by the car-body, and thence up, as shown in broken lines in Fig. 1, at the rear end of the dashboard and are joined and hung over a suitable hook f'''' accessible to the driver or motor-man.

When the fender is to be put out of use, as when the car is going in the other direction so that the fender is at the rear, the motor-man lifts the cord f, thus withdrawing the bolts F and allowing the spring E E' to pull back the bar D, whose bifurcated ends slide on the bar f, and hence to draw back the fender-frame C C' C" under the car where it is supported by the bars d.

It will be noticed by reference to Fig. 1 that the major portion of the bar D is above the bars d, the portions below it being only extensions formed in order to produce bifurcations at the ends of the bar D so as to allow it to embrace and slide on the bars d. Hence there is ample opportunity for the fender frame, which is hinged sufficiently near the upper edge of the bar D, to slide over and upon the bars $d$ and be supported in a raised position thereby, when the fender is not in use.

The fender-frame is provided on the under side with a roller $h$, not new in this invention, for coming in contact with the track or ground when the fender is dropped into the position shown in Fig. 1. A spring H has its opposite ends secured to the sides C of the frame and extends forward of the front rail C″ as shown, in order to ease the force of the blow in case a person is struck.

The fender-frame incloses and supports a fender consisting of two distinct portions, viz., a rear stationary portion and a forward swinging portion. A guard constructed preferably of net-work, is supported by the dash-board, such guard consisting essentially of the rear portion or wall I, preferably conforming in shape to the curvature of the dash-board, and the sides I′ extending along the edges of the fender-frame to a point as far forward as, or a little beyond the main or rear portion of the fender. This guard is provided on its upper edges, and elsewhere if desired, with pads or cushions I″. Hence when the forward portion of the fender has been swung up, as is the case when a person has fallen upon the fender, (as below fully described) the person thus caught in the fender is inclosed completely by the three walls of the guard and the swinging portion of the fender, and is moreover saved from injury in case of contact with the upper rails of the side portion I′ of the guard, by the said cushions or pads I″. C‴ is a cross bar extending from one to the other of the bars C between the front and rear portions of the fender. The rear or stationary portion is provided with a floor or bottom J supported by the parts C C′ C‴. This floor is provided on its upper surface with, say four springs J′ which support a platform K of substantially or nearly the same area as the floor. The forward or swinging portion of the fender consists of a lower substantially rectangular floor P and an upper floor P′ supported by said lower floor by means of suitable beams or supporting blocks P″. The rear edge of this portion is hinged at P‴ to the cross bar C‴. Beneath the platform K, supported by the floor J, is a spring L, one end of which is secured to the stud $l$ extending from the floor J, the center of which spring is coiled around a barrel or pin $l'$ also secured to said floor, and the other end of which has attached to it a cord N which extends up through a recess K′ in the forward edge of the platform K, over the cross bar C‴ and has its other end secured to a ring N′. From this ring two cords N″ extend divergingly and have their front ends secured to the upper surface of the upper floor P′.
See Figs. 2 and 3. (In Fig. 4 portions of the cords N N″ are represented as broken out.) Two cords R extend from staples or rings R′ secured to the front side of the bar C′ beneath the platform K, and pass forward convergingly under said platform through staples or rings $m$ (see Figs. 2, 3 and 4) over the cross bar C‴ down through an opening $n$ in the upper platform P′ and along between said platform P′ and the floor P, and have their forward ends secured to the rear end of a bolt or latch S which extends normally into the recess S′ in the bar C″, by means of a spring T which coils around a barrel T′ and has its opposite ends secured to a stud T″, as shown in Fig. 4.

The operation is as follows: When the fender strikes a person and trips him he falls naturally, not on the front portion but wholly or mostly upon the rear portion of the fender, striking upon the platform K with the effect of depressing it upon the spring, J′, the front edge of said platform bearing upon and pressing down the cords R thus withdrawing the spring-bolt S from its socket or recess S′. This allows the spring L to pull back on the cord N which instantly swings up the front portion of the fender into the position shown in Fig. 2, in which position the person is securely held and inclosed so that he cannot fall off or sustain injury.

I have deemed it advisable to provide a net-work or grating U within the space inclosed by the bars C C″ C‴ in order that this space may be filled and protection afforded while the forward portion of the fender is in a raised position.

It is intended that the fender shall be normally in a slightly raised position from the track, and be dropped upon the track by the motor-man in case of impending danger. This can readily be accomplished by means of the cords V having their lower ends secured at V′ to the bars C and extending upward over pulleys V″ supported by the platform to a ratchet drum W. By means of the ordinary pawl W′ this drum can be quickly released by the foot of the motor-man and the fender dropped, while the fender may be raised into its former position or to any desired height, by the handle W″.

Having thus fully described my invention, what I claim, and desire to secure by Letters Patent, is—

1. In a fender, the frame C C′ C″, a floor supported by said frame, a spring platform supported by said floor, a swinging platform hinged at its rear edge to the frame and adapted to be held normally in line with the fender-frame, and a cord connecting said swinging platform with said floor J and passing under the edge of the spring platform, whereby the depression of said spring platform bears down the cord and allows the swinging platform to be raised, substantially as described.

2. In a fender, the frame C C′ C″ provided with the cross piece C‴ the floor J, the spring platform K supported by said floor, the swinging platform P P′ hinged to said cross piece, a cord connecting the upper surface of the swinging platform with a spring secured to said floor J, a spring latch secured to the swinging platform and normally locking said swinging platform in line with the fender frame, and a cord passing from said latch under the front edge of the spring platform and secured to the frame, whereby the depression of the spring platform retracts the latch and allows the swinging platform to be raised, substantially as set forth.

3. In combination, the frame C C' C'', cross piece C''', provided with the eyes or staples m, spring platform K, spring latch S T T' normally in engagement with the front bar C'' by means of the recess S' therein, swinging platform comprising the lower floor P and upper floor P' separated by suitable supports and hinged to the cross piece C''', said upper floor being furnished with the perforation n, and cords extending from said spring latch between the floors P P' and through the perforations n and eye m and under the front edge of the platform to the rear portion of the fender frame, substantially as described.

4. In combination, the frame C C' C'', cross piece C''', floor J, spring platform K, provided with the recess K', swinging platform P P' hinged to said cross piece, cords N'' secured at their opposite ends to the upper surface of the swinging platform and the ring N', cord N extending from said ring down through said recess and under the spring platform, spring L connecting said cord N with the floor J, spring latch S T T', and cords R connecting said spring latch with the fender frame, substantially as set forth.

5. In combination, the fender frame, the spring platform supported thereby, the upwardly swinging platform supported by the same frame and situated forward of the spring platform, and the grating or net-work filling U, supported by the frame beneath the swinging platform, substantially as set forth.

6. In a fender, the side rails d, the sliding cross bar D, the fender frame hinged to said cross bar, the bolts F extending inwardly through said side rails and bearing against the rear side of said cross bar, levers F'' adapted to hold said bolts in position by means of suitable springs, connecting cords f'' extending from said levers up to a point on the car accessible to the motor-man, spring E E' secured to the car body, and cords connecting said spring with said cross bar and holding the latter against said bolts, substantially as described.

CHARLES B. STUART.

Witnesses:
ELISHA D. ATKINS,
GEORGE H. SNOW.